United States Patent [19]

Mann et al.

[11] Patent Number: 4,602,758
[45] Date of Patent: Jul. 29, 1986

[54] ARRANGEMENT FOR THE FORM-LOCKING GUIDANCE OF A LOAD SUPPORTED BY A TOP RAIL, ESPECIALLY OF AN ELECTRICALLY LONGITUDINALLY ADJUSTABLE MOTOR VEHICLE SEAT, ALONG AT LEAST ONE BOTTOM RAIL

[75] Inventors: Bernd Mann, Pfarrweisach; Hans Rampel, Ahorn; Emil Dinkel, Coburg, all of Fed. Rep. of Germany

[73] Assignee: Brose Fahrzeugteile GmbH & Co. KG, Fed. Rep. of Germany

[21] Appl. No.: 620,685

[22] Filed: Jun. 14, 1984

[30] Foreign Application Priority Data

Jun. 29, 1983 [DE]  Fed. Rep. of Germany ....... 3323431

[51] Int. Cl.⁴ ............................................ F16M 13/00
[52] U.S. Cl. .................................................... 248/430
[58] Field of Search ............... 248/430, 429, 393, 394, 248/416, 657; 308/3 R

[56] References Cited

U.S. PATENT DOCUMENTS

| | | | |
|---|---|---|---|
| 3,278,223 | 10/1966 | Panhard | 248/430 X |
| 3,853,298 | 12/1974 | Libkie et al. | 248/429 |
| 4,113,223 | 9/1978 | Kakizaki | 248/430 |
| 4,395,011 | 7/1983 | Torta | 248/393 |
| 4,422,612 | 12/1983 | Frank | 248/430 |
| 4,440,095 | 4/1984 | Mathieu | 308/3 R X |
| 4,511,187 | 4/1985 | Rees | 248/430 X |
| 4,520,982 | 6/1985 | Nishino | 248/430 |
| 4,533,107 | 8/1985 | Okazaki et al. | 248/430 |

Primary Examiner—J. Franklin Foss
Assistant Examiner—David M. Purol
Attorney, Agent, or Firm—Craig & Burns

[57] ABSTRACT

An arrangement for the form-locking guidance of a load supported by a top rail, especially of an electrically longitudinally adjustable motor vehicle seat, along at least one bottom rail, in which the bottom rail includes flanks surrounding a base of the top rail on both sides thereof; ball races are provided at the inner sides of the flanks which cooperate with ball races at the base of the top rail; the base of the top rail is slidingly supported on an upwardly pointing bearing surface of the bottom rail located between the flanks of the bottom rail.

20 Claims, 12 Drawing Figures

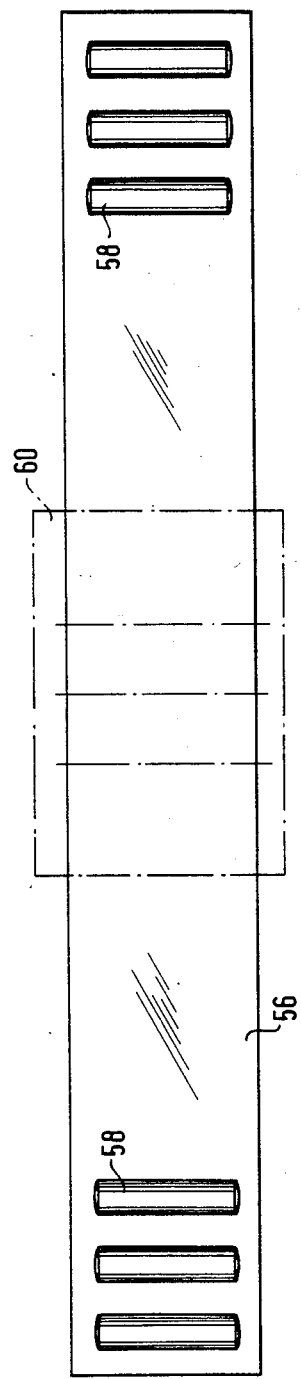
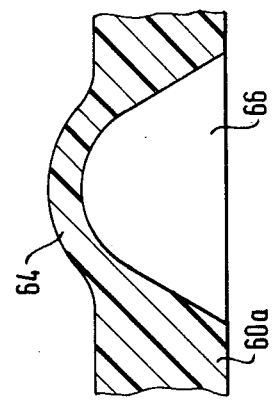
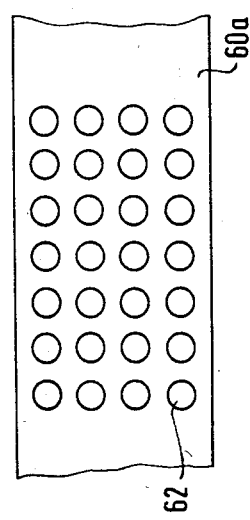
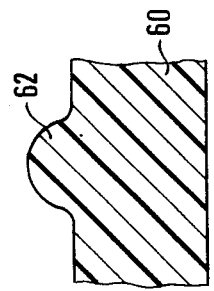

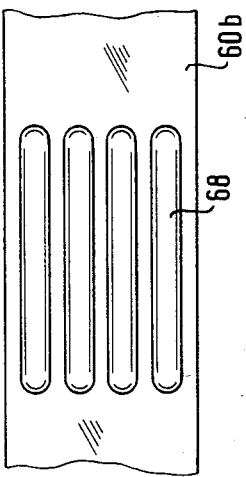
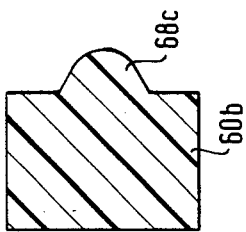
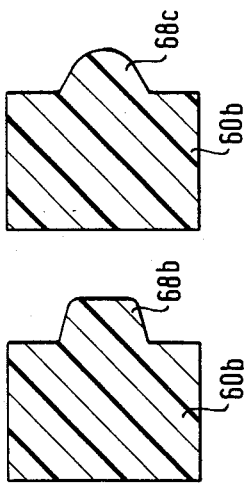
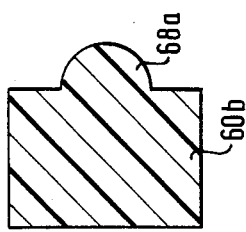
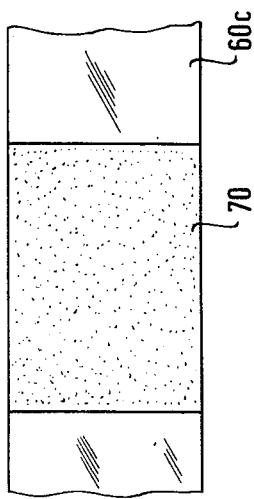
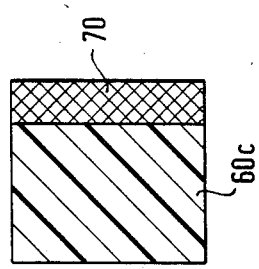

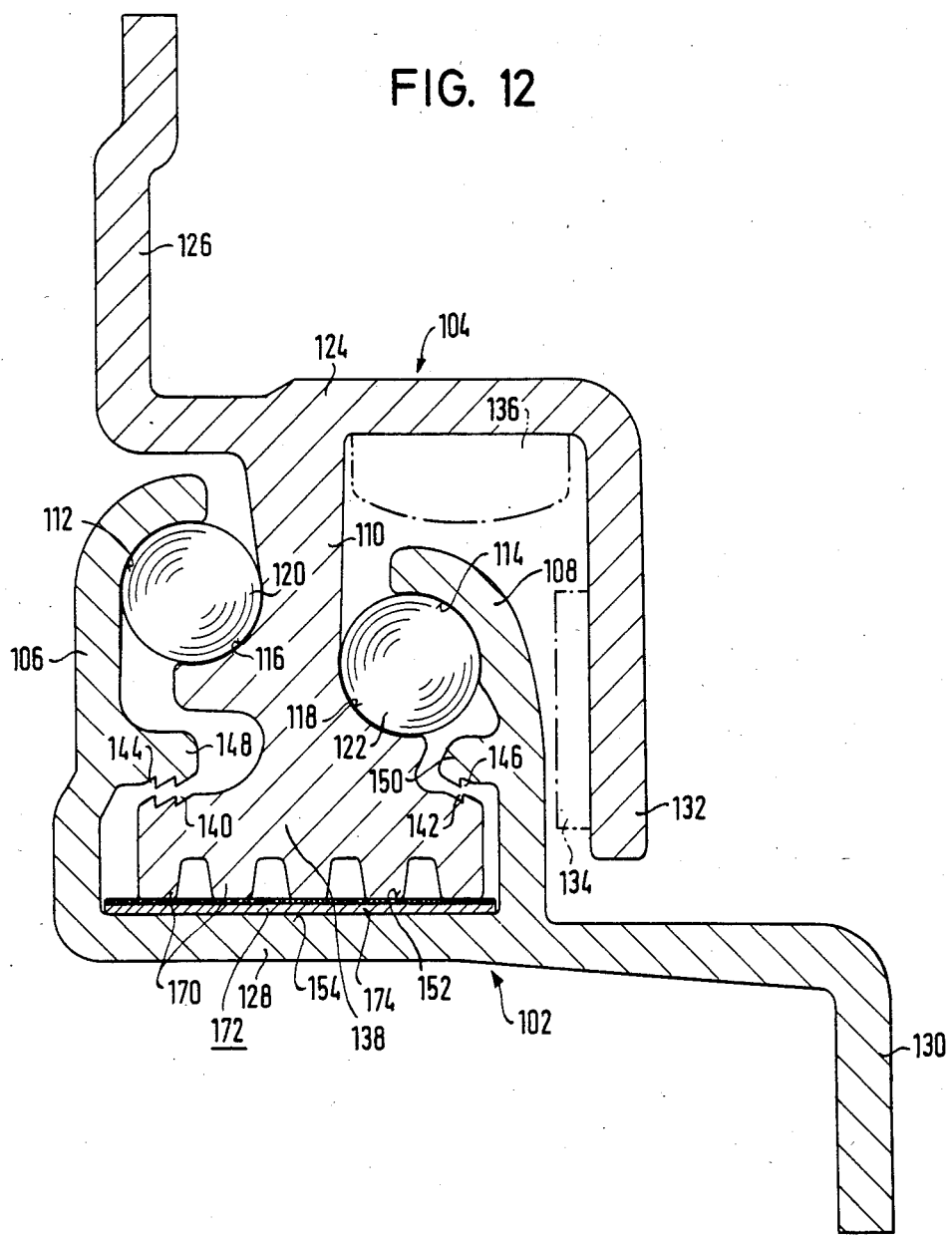

ARRANGEMENT FOR THE FORM-LOCKING GUIDANCE OF A LOAD SUPPORTED BY A TOP RAIL, ESPECIALLY OF AN ELECTRICALLY LONGITUDINALLY ADJUSTABLE MOTOR VEHICLE SEAT, ALONG AT LEAST ONE BOTTOM RAIL

The present invention relates to an arrangement for the form-locking guidance of a load supported by a top rail, especially of an electrically longitudinally adjustable motor vehicle seat, along at least one bottom rail.

An installation of this type is known from the German Offenlegungsschrift No. 31 22 124. In this prior art installation, guide rollers with vertical axis are arranged between an upper web of the top rail and an upwardly pointing surface of the bottom rail. However, such guide rollers—as found in practice—do not always produce a quiet, uniform movement of the top rail on the bottom rail.

It is the object of the present invention in an arrangement of the aforementioned type to assure a quiet, uniform displacement of the top rail on the bottom rail.

The underlying problems are solved according to the present invention in that the base of the top rail is slidingly supported on an upwardly pointing bearing surface of the bottom rail disposed between the flanks of the bottom rail.

The solution according to the present invention offers the advantage with respect to the prior art that the top rail is not supported at the bottom rail by means of guide rollers having a vertical axis, but instead the base may be far-reachingly component of the top rail, i.e., may extend close up to the bearing surface, as a result of which the unit of bottom rail and top rail becomes narrower in cross section than the corresponding prior art unit.

A very small adjusting force is desirable with motor vehicle seats adjustable by hand. With electrically longitudinally adjustable motor vehicle seats, it is desired, in particular if the rail is installed at an inclination, that a certain resistance opposes the adjustment.

In order to obtain such a resistance, brake means are provided according to a further feature of the present invention between the bottom surface of the base of the top rail and the bearing surface of the bottom rail disposed between the flanks of the bottom rail.

A particularly quiet, rattle-free movement of the top rail on the bottom rail with the desired resistance is obtained if, according to still another feature of the present invention, the brake means are provided at a bearing cage. The bearing cage may thereby be provided with brake surfaces that act on the bearing surface and/or the bottom surface of the base of the top rail. The bearing surfaces may have projections which are constructed either solid or elastic. In the alternative, the projections may be elongated in the direction of the rails. Furthermore, the brake surfaces may also be coated with fibers, preferably made of polyamide.

According to a modified construction in accordance with the present invention, the bearing surface of the bottom rail and/or the bottom surface of the base may be provided with a slide and brake coating, preferably of polyamide which is disposed on a support, preferably made of copper or a copper alloy.

These and other objects, features and advantages of the present invention will become more apparent from the following description when taken in connection with the accompanying drawing which shows, for purposes of illustration only, several embodiments in accordance with the present invention and wherein:

FIG. 2 is a plan view on a cage with needle rollers and brake surface in accordance with the present invention;

FIG. 3 is a plan view on a modified embodiment of a brake surface with projections;

FIG. 4 is a partial cross-sectional view illustrating a non-elastic projection of the brake surface according to FIG. 3;

FIG. 5 is a partial cross-sectional view through an elastic projection of the brake surface according to FIG. 3;

FIG. 6 is a partial plan view on a brake surface with ribs elongated in the displacement direction in accordance with the present invention;

FIGS. 7, 8 and 9 are cross-sectional views through different embodiments of the ribs in accordance with the present invention;

FIG. 10 is a partial plan view on the brake surface with a covering with fibers in accordance with the present invention;

FIG. 11 is a cross-sectional view through the brake surface according to FIG. 10; and FIG. 12 is a cross-sectional view, similar to FIG. 1, of a second embodiment including top and bottom rail in accordance with the present invention.

Figure 1:
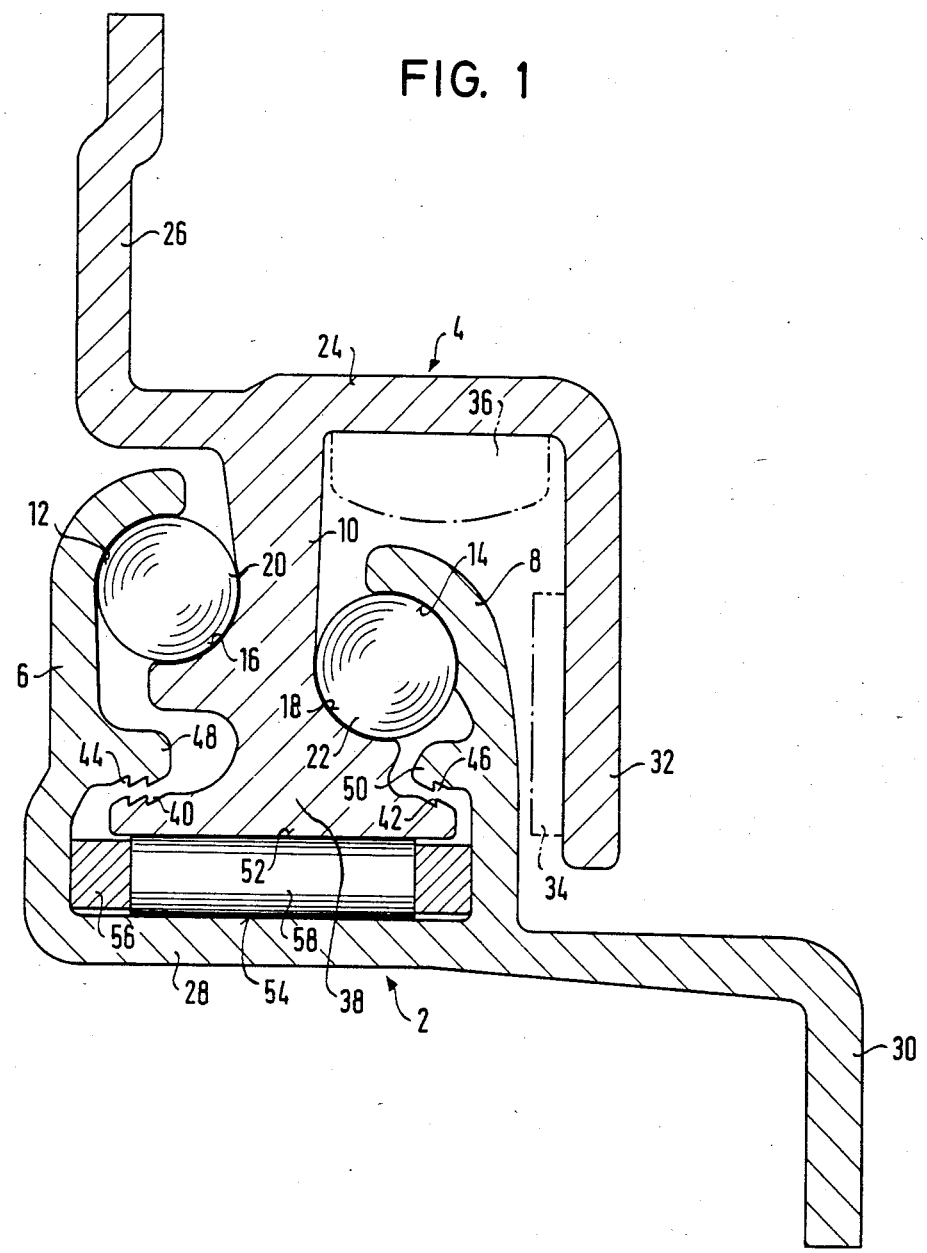
FIG. 1 is a cross-sectional view through a first embodiment of an installation in accordance with the present invention provided with top and bottom rail.

Referring now to the drawing wherein like reference numerals are used throughout the various views to designate like parts, the embodiment according to FIG. 1 includes a bottom rail generally designated by reference numeral 2 and a top rail generally designated by reference numeral 4. The bottom rail 2 surrounds with two flanks 6 and 8 a base 10 of the top rail 4 on both sides thereof. The inner sides of the flanks 6 and 8 are provided with ball races 12 and 14 which cooperate with ball races 16 and 18 provided at the base 10. Balls 20 are disposed between the ball races 12 and 16 and balls 22 between the ball races 14 and 18. It has thereby proved as appropriate to arrange the ball races 14 and 18 of the balls 22 lower than the ball races 12 and 16 with the balls 20, because the ball races 14 and 18 of the balls 22 are located inwardly, i.e., to a greater extent below the vehicle seat (it is of course assumed thereby that a seat is supported by two mirror symmetrical units of top rail and bottom rail). An upwardly directed leg 26 starts from the outer edge of an upper cross web 24 of the top rail 4, at which a conventional adjusting transmission for the seat is to be mounted. The lower cross leg 28 of the bottom rail 2 is extended in the direction underneath the bottom side of the seat and passes over into a downwardly directed leg 30, which serves the purpose of fastening.

The inner edge of the upper cross leg 24 of the top rail 4 passes over into a downwardly directly leg 32, on which a toothed rack is pivotally mounted for the displacement of the top rail 4. A rivet head 34 indicated in dash and dotted lines serves the fastening of the toothed rack. To the right of the base 10, a head 36 of a screw for fastening a seat is indicated in dash and dotted lines underneath the cross web 24. The bottom 38 of the base 10 is widened on both sides thereof and is provided on its surface with longitudinally extending hook-shaped profiles 40 and 42; hook-shaped profiles 44 and 46 at the inner extensions 48 and 50 of the flanks 6 and 8 are disposed opposite the hook-shaped profiles 40 and 42. The purpose of these hook-shaped surfaces is described in detail in the German Pat. No. 31 22 124.

A needle bearing cage 56 with needles 58 is arranged between the bottom surface 52 of the base 10 and the upper boundary surface 54 of the cross web 28 of the bottom rail 2 which is disposed opposite thereto. Such a needle bearing cage is illustrated in plan view in FIG. 2. The number of needles 58 depends on the required load-bearing capacity. A brake surface 60 (FIG. 2) is disposed between needles 58 seated in the needle bearing cage 56 at both ends; the size and construction of the brake surface 60 is dependent on the desired minimum displacement force.

FIG. 3 illustrates in plan view a brake surface 60a which is provided with rows of knubs 62.

As shown in partial cross-sectional view in FIG. 4, the knubs 62 are hemispherically shaped in this embodiment.

In the embodiment according to FIG. 5, elastic or springy knubs 64 are provided. The spring action is achieved in that the space 66 underneath the knubs 64 is hollowed out.

The brake surface 60b according to FIG. 6 includes as brake element ribs 68 extending in the longitudinal direction. In the embodiment according to FIG. 7, hemispherically shaped ribs 68 are provided whereas in the embodiment according to FIG. 8, trapezoidally shaped ribs 68b are provided and in the embodiment according to FIG. 9, conically shaped ribs 68c are provided.

The brake surface 60c according to FIGS. 10 and 11 carries as brake lining a fiber coating or flocking 70, preferably consisting of polyamide fibers. Such a fiber coating or flocking provides—which is particularly advantageous—a clearance compensation and is both damping as well as noise-reducing.

The embodiment according to FIG. 12 corresponds in its essential details to that of FIG. 1. Corresponding elements are therefore designated with corresponding reference numerals of the 100 series and will not be described in detail. The bottom surface of the base 110 is subdivided into strips 170 extending in the longitudinal direction of the rails 102 and 104. The bearing surface 154 of the bottom rail 102 is provided with a slide and brake coating 172, preferably of polyamide. The slide and brake coating is disposed on a carrier or base 174 secured at the bottom rail 102, and preferably consisting of copper or of a copper alloy. One obtains both the desired sliding action as also the desired braking action by the slide and brake coating 172.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An installation for the form-locking guidance of a motor vehicle seat supported by a top rail means along at least one bottom rail means, in which the top rail means includes a base and the bottom rail means includes flanks surrounding the base of the top rail means on both sides thereof, the flanks being provided at the inner sides thereof with ball races cooperating with ball races provided at the base of the top rail means, the bottom rail means further including an upwardly pointing bearing surface means between the flanks thereof, the base of the top rail means being slidingly supported on the upwardly pointing bearing surface means of the bottom rail means characterized in that said base is a component of said top rail extending downwardly from a cross leg of said top rail into the proximity of said bearing surface and being supported on said bearing surface by means of its bottom with braking means provided between the undersurface of said bottom and said bearing surface, and wherein the bottom of the base has a larger area than the cross-sectional area at the top of the base by virtue of extending beyond the top of the base on both sides of the base.

2. An installation according to claim 1, wherein the braking means includes brake surface means which act on at least one of bearing surface means and bottom surface of the base of the top rail means.

3. An installation according to claim 2, wherein the brake surface means includes projections protruding toward at least one of bearing surface means and bottom surface.

4. An installation according to claim 3, wherein the projections are constructed solid.

5. An installation according to claim 3, wherein the projections are constructed elastic.

6. An installation according to claim 3, wherein the projections are elongated in the direction of the rail means.

7. An installation according to claim 2, wherein the brake surface means are coated with fibers.

8. An installation according to claim 7, wherein said fibers consist of polyamide.

9. An installation according to claim 6, wherein the projections are constructed solid.

10. An installation according to claim 6, wherein the projections are constructed elastic.

11. An installation according to claim 1, wherein at least one of the bottom surface of the base and the bearing surface means of the bottom rail means is subdivided into strips extending in the longitudinal direction of the rail means.

12. An installation according to claim 11, wherein at least one of the bearing surface means of the bottom rail means and the bottom surface of the base is provided with a slide and brake coating.

13. An installation according to claim 12, wherein said coating consists of polyamide.

14. An installation according to claim 12, wherein the slide and brake coating is disposed on a support secured at one of the bearing surface means of the bottom rail means and the bottom surface of the base.

15. An installation according to claim 14, wherein said support consists of copper or a copper alloy.

16. An installation according to claim 1, wherein the brake means includes projections protruding toward at least one of the bearing surface means and bottom surface.

17. An installation according to claim 16, wherein the projections are constructed solid.

18. An installation according to claim 16, wherein the projections are constructed elastic.

19. An installation according to claim 16, wherein the projections are elongated in the direction of the rail means.

20. An installation according to claim 1, wherein the brake means are formed by surfaces coated with fibers.

* * * * *